June 8, 1943.   M. L. SAPPENFIELD   2,321,323
AMMUNITION TRIMMING APPARATUS
Filed March 18, 1942   2 Sheets-Sheet 2
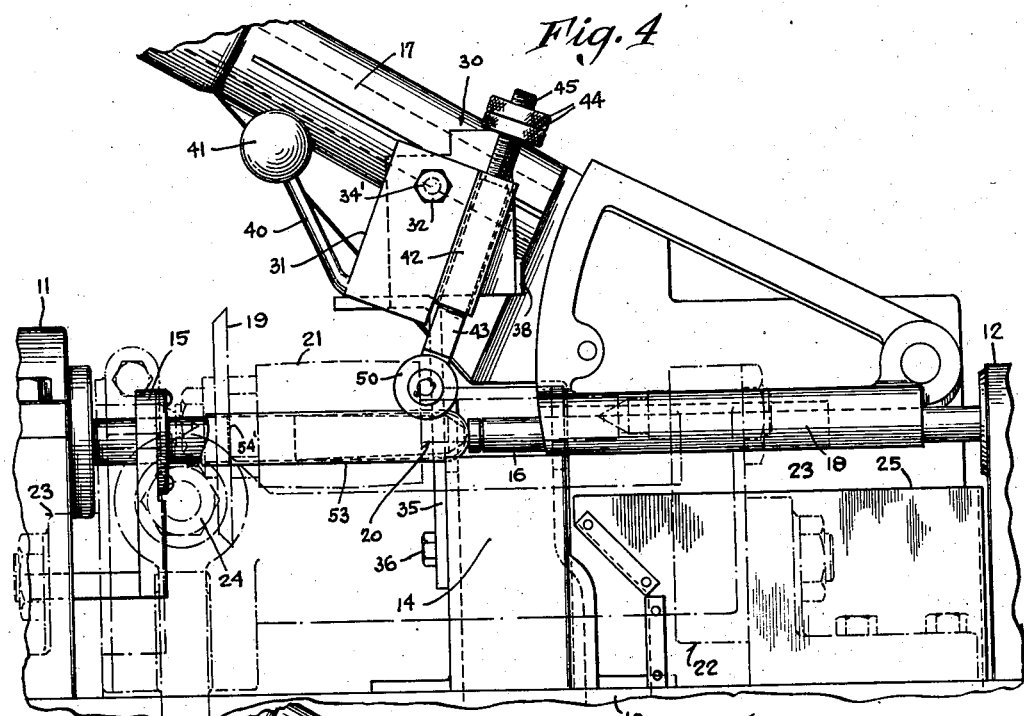
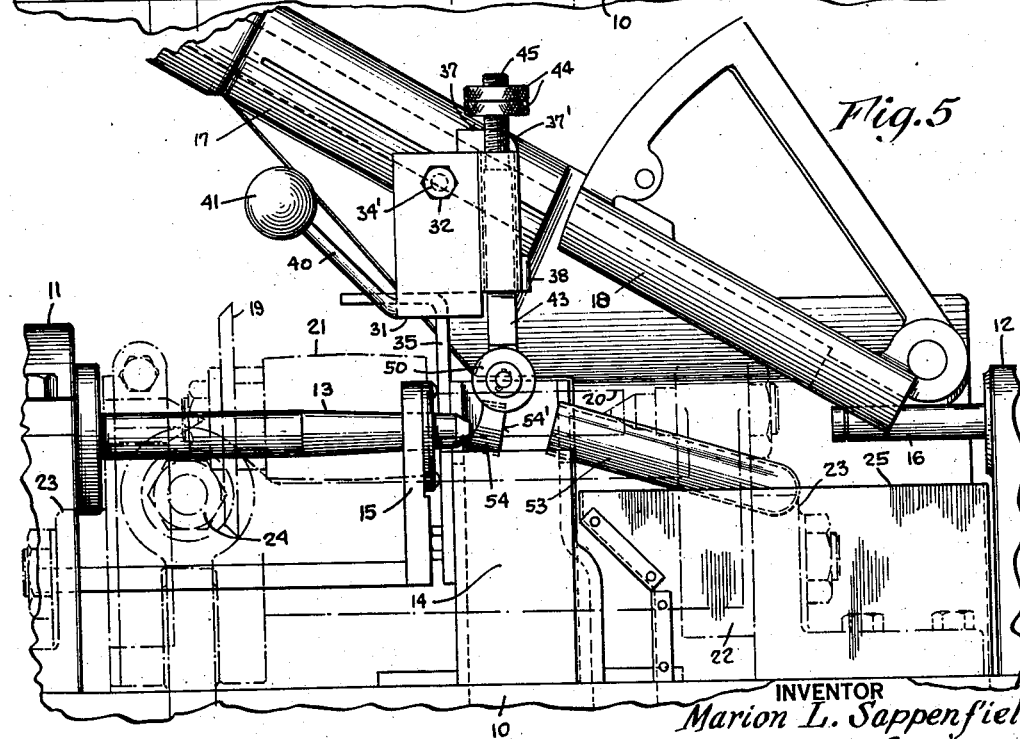
INVENTOR
Marion L. Sappenfield
BY Harold L. Gammons
AGENT Patented June 8, 1943

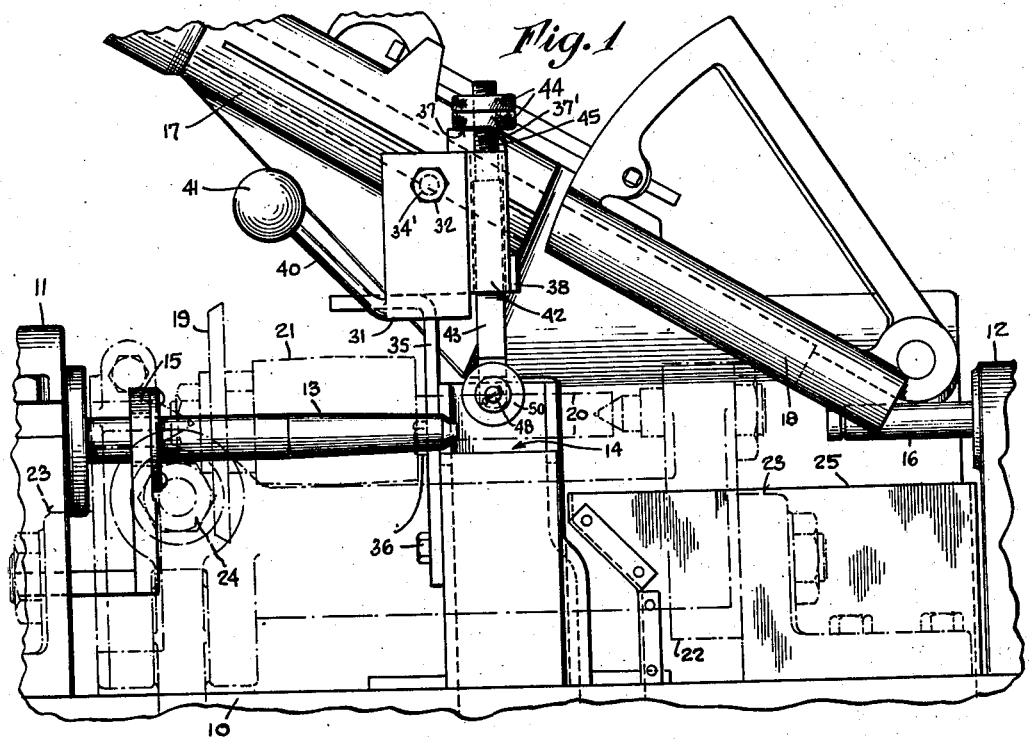

2,321,323

UNITED STATES PATENT OFFICE 2,321,323

AMMUNITION TRIMMING APPARATUS

Marion L. Sappenfield, Kansas City, Mo., assignor to Remington Arms Company, Inc., Bridgeport, Conn., a corporation of Delaware Application March 18, 1942, Serial No. 435,199

9 Claims. (Cl. 164—69)

This invention relates to a machine for cutting-off or trimming metallic tubes or tubular articles and more particularly to a device for segregating the trimmings and the trimmed articles.

For the sake of clarity and conciseness, it is proposed to confine the description of the invention to its application to machines for cutting-off the open ends of metallic tubular articles adapted to the manufacture of cartridge cases, but it will be understood that this particular adaptation is for the purpose of illustration only and that the invention may have other similar and equivalent uses within the scope of the appended claims.

In the manufacture of a certain cartridge case a disk or blank of suitable metal such as brass or an alloy of brass is shaped by successive drawing and annealing operations into the form of a cylindrical tube substantially ¾ of an inch in outside diameter and 5 inches in overall length. One end of the tube is closed while the opposite end is open, the edge thereof being rough and somewhat irregular. In order to provide cases with squared ends and of uniform overall length, it is necessary to trim or cut off the irregular open ends of the tubes.

Machines suitable for trimming the ends of cartridge tubes are extensively used, especially in the production of .30 and .50 caliber ammunition. Typical of such machines is the type hereinafter described which comprises a suitable lathe bed having a rotating mandrel at the head end. The tubes to be trimmed are transferred into alignment with the mandrel, open end first, by an oscillating sector which receives the tubes, successively, from a suitable hopper. A reciprocating plunger supported in the tail end of the machine and in alignment with the mandrel, moves the tubes from the transfer sector onto the rotating mandrel and thereafter a cutting tool, either rotating or stationary, is brought into cutting engagement with the rotating tube so as to trim or cut-off a scrap ring. Finally a suitable stripper, comprising a collar or sleeve slidably mounted on the mandrel, is advanced rapidly towards the tail end of the machine thereby stripping the scrap ring and trimmed tube off of the mandrel.

In order to segregate the scrap rings and the trimmed tubes, separate discharge orifices or chutes are provided which are arranged in the bed of the machine substantially in alignment with the mandrel and in a position to receive the trimmings and tubes as they are stripped off the mandrel. It has been found, however, that in the absence of means for urging the scrap rings into the scrap chutes these trimmings will go astray and get mixed with the trimmed cases or foul the operation of the machine.

One solution of this difficulty has been to direct a blast of air into the scrap discharge chute from a position opposite the chute orifice. The trimmed tube, being considerably heavier than the scrap ring, passes over the scrap chute unaffected by the blast of air while the scrap ring, being relatively light, is deflected and blown down into the chute.

While this expedient has been used extensively, it does not effect positive ejection of the scrap and consequently fouling and other irregularities frequently occur which greatly impair the efficiency of the machine. Furthermore, the installation of an air blast in each machine requires extensive piping and relatively expensive equipment.

It is an object of this invention to provide a device for positively deflecting and ejecting scrap material from a tube trimming machine. A further object is to provide scrap ejecting means adapted to be supported and traversed by the article to be trimmed. A still further object is to provide a member with a deflecting surface adapted to be supported and oscillated by the article to be trimmed so as to engage the scrap and positively retard and deflect the latter on ejection of the trimmed article.

Various other objects, features and advantages of the invention will be described in detail in the specification which follows, reference being made to the drawings in which:

Fig. 1 is a front elevation of the scrap ejecting device of this invention shown mounted adjacent the scrap chute of a tube trimming machine of which a fragmentary view is shown.

Fig. 2 is a plane view of the ejecting device shown in Fig. 1.

Fig. 3 is an end elevation of the scrap ejecting device shown in Fig. 1.

Fig. 4 is a view of the ejecting device and trimming machine of Fig. 1, the ejector being displaced from its normal position so as to engage the scrap ring.

Fig. 5 is a view of the ejecting device and trimming machine of Fig. 1, the ejector being displaced from its position shown in Fig. 4 to its effective position.

Fig. 6 is a fragmentary front elevation of a modification of the scrap ejector.

Fig. 7 is a fragmentary end elevation of the modification shown in Fig. 6.

The term "normal" as hereinafter used, shall be understood to designate that position from which an element moves or is moved to perform its function or functions, while the terms "right hand" and "left hand" shall be understood to designate the right and left sides, respectively, of the machine or element as viewed in Fig. 1.

Referring to the drawings, 10 is the base of the trimming machine on which is mounted a head-stock 11 and tail-stock 12. A mandrel 13 is rotatably mounted in the head-stock with its free end substantially adjacent the orifice of a scrap chute 14. 15 is the yoke portion of a mandrel stripper which comprises a bushing carried on the mandrel and reciprocated thereon by the yoke, the latter being actuated by a suitable cam means, not shown, from its normal position adjacent the head-stock 11 to its effective position which is substantially adjacent the free end of the mandrel as shown in Fig. 5. The tail-stock 12 supports a pusher rod 16 which is in axial alignment with the mandrel 13 and which is advanced by suitable mechanism in the tail-stock from its normal position to a position overlying the scrap chute orifice, see Fig. 4. The tubular articles or cartridge tubes are automatically fed, open end first, onto the free end of the rotating mandrel 13 by the pusher rod 16, the tubes being transferred from a suitable supply 17 to a position in front of the retracted pusher rod by an oscillating sector 18 which is of well-known construction. It will be clear that the sliding fit between the mandrel and tube is sufficiently snug so that tube will be positively rotated by rotation of the mandrel. The cutter for trimming off the mouth of each tube is a disk 19 which is carried on a horizontal shaft 20 which, in turn, is rotatably supported at each end by a suitable dead center mounted at opposite ends respectively of a yoke member 22. A hub or pulley 21 is secured on the shaft 20 and is adapted to be driven by a suitable drive belt, not shown, whereby the shaft 20 and cutter 19 are rotated. The yoke 22 is pivoted as at 23, 23 to the machine bed and oscillated by suitable means, not shown, so as to carry the rotating cutter 19 into engagement with a rotating tube. 24 is a conventional screw threaded adjusting means, in engagement with the pivoted yoke, for adjusting the cutting edge of the disk 19 with respect to the tube. A discharge chute for the trimmed tubes is indicated at 25.

The above description is of a conventional trimming machine well adapted to the purposes of this invention, but it will be understood that the invention, as defined in the appended claims, is not limited thereto but may be used in conjunction with any suitable tube trimming or cut-off machine.

The scrap ejecting device of this invention comprises two principal members designated generally as 30 and 31, the member 31 being pivotably supported on the fixed member 30 by a bolt 32 which is secured by a nut 33 in axially aligned holes 34, 34' of the members 30 and 31 respectively. These holes are drilled eccentric to the geometrical centers of the members 30 and 31 and are shown located in the upper left hand portion of each member in order to obtain substantially the maximum longitudinal displacement of any point on one member relative to the corresponding point on the other. It will be clear, however, that the eccentricity of the pivot point may be varied somewhat without affecting any substantial change in the operation of the invention as hereinafter described.

The fixed member 30 comprises a rectangular base plate, hereinafter referred to as a base member or bracket, supported in a substantially vertical plane lengthwise of the machine by an integrally formed L-shaped leg 35. The leg 35 may be secured at its lower extremity by bolts 36 to any fixed part of the machine such as the bed or, as shown in Fig. 1, to a wall of the scrap chute 14. The leg 35 is also provided with a right bend as at 35', see Fig. 3, in order to position the pivoted member 31 in substantially the vertical plane of the machine mandrel 13.

The upper edge of the base plate 30 adjacent its right hand corner, as seen in Fig. 1, extends upwardly a suitable distance to form an elevated bearing surface 37, having a rounded corner at 37'. Adjacent the lower right hand corner of the plate 30 is formed, or suitably secured by bolts, a lug 38 which projects forwardly substantially at right angles to the plane of the plate 30, and is adapted to constitute a stop for the pivoted member 31.

The pivoted member 31, hereinafter referred to as a carrier or carrier member, is also rectangular and substantially of the same overall dimensions as the base member 30. An arm 40 projects upwardly at an angle of substantially 45 degrees from the lower left hand corner of the carrier 31 and terminates in a ball weight 41 which may be formed as an integral part of the arm or may be attached thereto by a threaded connection.

The portion of the carrier comprising the right hand edge thereof is formed as a substantially vertical channel 42 which, as shown in Fig. 2, is formed by making a U shaped rectangular bend in the plate 31, with the open side of the bend facing rearwardly. When the carrier 31 is mounted on the base plate or bracket 30, the latter forms, in effect, the fourth and closing side of the channel 42, the right hand edge of the channel normally abutting the stop member 38.

The channel 42 is adapted to carry a rectangular post 43 having a sliding fit in the channel and supported therein by a pair of nuts 44 which are adjustable on the upper screw-threaded shank portion 45 of the post 43 and adapted to engage the elevated bearing surface 37. Thus by turning the nuts 44, the post 43 may be raised or lowered in its channel or guide 42. It will be clear that when the carrier 31 rotates about the pivot pin 32, the nut 44, which is in engagement with the bearing surface 37, will ride over the rounded corner 37' thereof, the corner 37' being suitably contoured for this purpose.

Referring to Fig. 3, the lower end of the post 43 is reduced in size so as to form a tongue 46 which is provided with a hole 47 drilled transversely to the axis of the mandrel and of suitable diameter to receive an axle 48 which may be secured in the hole 47 with a press fit. Each end of the axle is extended on respective sides of the tongue to rotatably support a disk 50 having an inwardly beveled face 51. The disks 50 may be retained on the ends of the axle 48 by any suitable means such as cotter pins 52, and are sufficiently spaced apart by the tongue so that the beveled faces 51 will engage corresponding areas on the opposite sides of the tubes.

In operation, as a tube 53 is fed onto the mandrel 13 by the pusher rod 16, the upper surface of the tube engages the beveled faces 51 of the disks 50, which in their normal position, are suitably adjusted to project downwardly slightly into the path of the advancing tube. When the leading edge of the tube engages the beveled surfaces 51, the post 43, carrying the disks 50, is lifted in the channel 42 of the carrier 31 which, in turn, pivots clockwise (see Fig. 1); simultaneously the disks are traversed by the tube 53 until the latter reaches its fully advanced position on the mandrel. Except for the pivotal mounting of the carrier the tube in its fully advanced position would have passed beyond the disks and consequently the latter would no longer be supported and would drop to their normal position. While it is possible that vertical displacement only of the disks 50 would suffice to positively deflect the trimmed scrap in the manner hereinafter described, it is preferable, in order to avoid scratching or deforming the tube due to excessive friction between the engaging surfaces of the tube and disks, to permit the carrier 31 to pivot as hereinabove described, whereby the disks may move not only upwardly but substantially longitudinally with the tube to a position such as indicated in Fig. 4. This pivotal movement of the carrier is further desirable in order to withdraw and withhold the disks from their normal position, for it will be clear that if the disks were permitted to drop down to their normal position immediately after the tube had been advanced onto the mandrel, the disks would then lie in the path of the trimmed tube as it was being stripped from the mandrel and might possibly deflect or retard the ejection thereof.

As soon as the tube 53 has been fully advanced onto the mandrel, the cutter 19 moves into engagement with the rotating tube and cuts off a piece of scrap 54 which, of course, is supported by the mandrel. Thereafter the cutter returns to its normal position and the stripper 15 advances to engage the scrap ring 54 and strip the scrap and tube off of the mandrel. As the tube is being stripped from the mandrel, the frictional engagement of its surface with the beveled surfaces 51 tends simultaneously to rotate the disks 50 and to pivot the carrier back to its normal position. Consequently, when the relatively rough edges 54' of the cut made by the cutter engage the surfaces 51, the frictional contact is sufficient to pivot the carrier and so return it to its normal position, the tapered surfaces 51 of the disks being in positive engagement with the cut edge 54' of the scrap ring 54. Hence, as the tube and the scrap ring are projected off of the end of the mandrel, the tube 53 is substantially free from contact with the disks, and continues its flight unchecked until it drops into its chute 25, whereas the flight of the scrap ring 54 is retarded by engagement with the disks 50 and positively deflected into the discharge chute 14, this movement being assisted by the drop of part 43 to its normal position in the guide way, bringing the adjusting nuts 44 into contact with surface 37. It will be evident that the normal position of the disks 50 relative to the path of the tube may be varied somewhat by the adjusting nuts 44 so that the weight or frictional engagement of the disks with the tube may be increased or decreased. By this adjustable feature, full advantage may be taken of the relative weights of the tube and scrap ring so that the maximum weight of the disks may be applied to retard and deflect the relatively light-weight scrap ring without affecting deflection of the relatively heavy trimmed tube.

A modification of the means for retarding and ejecting scrap ring is shown in Figures 6 and 7. These drawings show a single disk 55 having a blunt edge formed by two beveled surfaces 56 and 56' and rotatably mounted in a slot 57 formed in the end of a post 43'. It will be noted that the axis 58 of the disk 55 is parallel to the axis of the mandrel so that the disk is transverse thereto.

This modification operates substantially in the manner above described, but as shown in Fig. 6, the blunt edge 56 is adapted to actually catch in the cut 60 formed in the tube 53, thus effecting more positive engagement of the trimmed edge 54' of the scrap ring 54 with beveled edge 56 of the disk 55. As in the previous case, as the disk 55 is being returned to its normal position its beveled surface 56 retards the scrap ring 54 and finally deflects the ring from its normal path into the scrap ejection chute 14. The beveled surface 56' is also adapted to act as a cam surface which facilitates the elevation of the disk when engaged by the leading edge of the advancing tube.

Although the above description has been given with respect to suitable means for trimming a metal cartridge tube, it will be understood that any other kind of tubular article may be so trimmed and that other variations and modifications in the invention may be made within the scope of the appended claims, which claims are to be broadly construed.

What is claimed is:

1. In a work-trimming machine, the combination comprising work-holding means, work-trimming means and means for ejecting work and scrap from said work-holding means, and gravity actuated means supported directly on said work and scrap during their ejection movement for directing the scrap into a scrap receptacle.

2. In a work-trimming machine, the combination comprising work-holding means, work trimming means and means for ejecting the work and scrap from said work holding means, and gravity actuated means supported directly on and traversed by said work and scrap during the ejection thereof to positively deflect the scrap into a scrap receptacle.

3. In a tube trimming machine, the combination with a mandrel, means for moving a tube from a supply into alignment with said mandrel, means for moving said tube onto said mandrel, means for trimming said tube and means for removing said tube and trimming from said mandrel; of means for positively deflecting the trimming out of the wake of the tube.

4. In a tube trimming machine, the combination with a mandrel, means for moving a tube from a supply into alignment with said mandrel, means for moving said tube onto said mandrel, means for trimming said tube and single means for removing said tube and trimming from said mandrel; of a discharge chute for the trimmings and means for positively deflecting the trimmings into the chute from said mandrel.

5. In a tube trimming machine, the combination with a mandrel, means for moving a tube from a supply into alignment with said mandrel, means for moving said tube onto said mandrel, means for trimming one end of said tube and means for removing said tube and trimming from said mandrel; of a discharge chute for the trimmings and means for positively deflecting the trimmings into the chute, said means comprising an element adapted to be supported on the surface of said tube.

6. In a tube trimming machine, the combination with a mandrel, means for moving a tube from a supply into alignment with said mandrel, means for moving said tube onto said mandrel, means for trimming one end of said tube and means for removing said tube and trimming from said mandrel; of a discharge chute for the trimmings and means for positively deflecting the trimmings into the chute, said means comprising a carrier and an element slidably mounted on said carrier and adapted to be moved with respect thereto when engaged by said tube.

7. In a tube trimming machine, the combination with a mandrel, means for moving a tube from a supply into alignment with said mandrel, means for moving said tube onto said mandrel, means for trimming one end of said tube and means for removing said tube and trimming from said mandrel; of a discharge chute for the trimmings and means for positively deflecting the trimmings into the chute, said means comprising a fixed bracket, a carrier pivoted to said bracket, and a discoidal member mounted on said carrier for longitudinal displacement with respect thereto and adapted to be displaced upwardly by the engagement with the surface of said tube.

8. In a tube trimming machine, the combination with a mandrel, means for moving a tube from a supply into alignment with said mandrel, means for moving said tube onto said mandrel, means for trimming one end of said tube and means for removing said tube and trimming from said mandrel; of a discharge chute for the trimmings and means for positively deflecting the trimmings into the chute, said means comprising a fixed bracket, a carrier pivoted to said bracket and having a channel portion, a post slidable in said channel and an element on the lower end of said post having a beveled surface adapted to engage the trimmings.

9. In a tube trimming machine, the combination with a mandrel, means for moving a tube from a supply into alignment with said mandrel, means for moving said tube onto said mandrel, means for trimming one end of said tube and means for removing said tube and trimming from said mandrel; of a discharge chute for the trimmings and means for positively deflecting the trimmings into the chute, said means comprising a fixed bracket, a carrier pivoted to said bracket and having a channel portion, a post slidable in said channel, means for adjusting said post in said channel and a wheel rotatively carried on the lower end of said post having a beveled surface adapted to engage the cut made in the tube by said trimming means.

MARION L. SAPPENFIELD.